United States Patent

[11] 3,617,321

[72] Inventor Raymond C. Kent
   Lancaster, Pa.
[21] Appl. No. 853,962
[22] Filed Aug. 28, 1969
[45] Patented Nov. 2, 1971
[73] Assignee Armstrong Cork Company
   Lancaster, Pa.

[54] SPRAY-ON COATING COMPOSITION
   3 Claims, No Drawings
[52] U.S. Cl................................................ 106/186,
   106/177, 106/193, 260/41
[51] Int. Cl................................................ C08b 27/10
[50] Field of Search.................................. 106/177,
   186, 193 I

[56] References Cited
   UNITED STATES PATENTS
2,699,401  1/1955  Grossi ..................... 106/193 I
2,880,104  3/1959  Scholl ...................... 106/128
2,902,379  9/1959  McCollum ............... 106/75
2,993,016  7/1961  Sucetti ..................... 106/193 I
3,000,876  9/1961  Touey ...................... 106/186

OTHER REFERENCES
Chem. Abst. 47:5088, 1951 Copy in Chem. Library

Primary Examiner—Morris Liebman
Assistant Examiner—T. Morris
Attorney—William G. Taylor ABSTRACT: Spray-on coating composition adapted for forming monolithic white ceiling structures having, on a dry weight basis, 5 to 35 percent by weight expanded perlite; 10 to 40 percent by weight fibrous talc; 15 to 80 percent by weight inorganic filler; 1 to 4 percent by weight organic binder; 0 to 1 percent by weight cross-linking agent and 1 to 5 percent by weight fine fibrous asbestos. The dry ingredients are mixed with sufficient water to provide a spray-on coating composition having a viscosity in the range of from 10 to 30 poises at a shear rate of 60 seconds $^{-1}$.

SPRAY-ON COATING COMPOSITION

BACKGROUND OF THE INVENTION

1. Field of the Invention

The invention relates to spray-on coating compositions adapted for forming monolithic ceilings in old and new construction.

2. Description of the Prior Art

Various spray-on coating compositions adapted for water proofing building structures are known (U.S. Pat. No. 2,402,474) as well as the use of spray-on coating compositions containing asbestos for forming sound deadening layers in commercial building establishments. It is also known to form acoustical tile from perlite and organic binder containing slurries (U.S. Pat. No. 2,690,594) and to use asbestos-perlite agglomerates for cement and plaster (U.S. Pat. No. 2,902,379).

SUMMARY OF THE INVENTION

In accordance with the invention, I have discovered a unique spray-on coating composition which, when sprayed in place in either old or new construction, readily adheres to ceiling and wall surfaces and provides a textured coating with superior visual and physical characteristics. Sprayed ceilings formed in accordance with this invention are extremely attractive since they are seamless and can be applied with various degrees of surface roughness, and coated surfaces formed from the particular ceiling spray compositions of this invention have a high degree of whiteness, resistance to abrasion and incombustibility. The spray-on system of ceiling coating has many economic advantages such as one coat coverage, extremely rapid application rate and minimum of surface preparation.

These important features of the invention have been created by uniformly distributing expanded perlite particles throughout a water slurry utilizing a unique combination of ingredients to keep the buoyant perlite particles from separating out of the slurry during mixing and spraying and to give a resultant tough adherent white textured coating.

DESCRIPTION OF THE PREFERRED EMBODIMENTS

The solids utilized in forming the spray-on coating composition of this invention comprise, on a dry weight basis, 5 to 35% by weight of expanded perlite particles, 10 to 40% by weight of fibrous talc, 15 to 80% by weight of inorganic fillers such as clay and calcium carbonate, 1 to 4% by weight of an organic binder of which Methocel (methyl cellulose) is preferred, 0 to 1% by weight of a cross-linking agent for the organic binder, such as dicyandiamide, and 1 to 5% by weight of coalinga (very fine asbestos fibers). The dried ingredients are thoroughly mixed and then slurried with water to form a slurry having a viscosity in the range of from about 10 to 30 poises at a shear rate of 60 seconds$^{11}$.

Perlite particles offer a distinctive whiteness to ceilings formed from the spray-on coating compositions of this invention. The abrasion resistance of this spray is mainly attributable to the nonfriability of the perlite particles and ceilings formed from the spray-on coatings of this invention are essentially incombustible.

In the composition above described, the fibrous talc performs as both a semireinforcing filler material and also acts as a lubricant in the spraying process. The inorganic fillers are present to add bulk to the spray and the organic binder binds the spray to the substrate and is particularly effective when a small percentage of an organic cross-linking agent is present in the binder system. The fibrous asbestos also acts as a fibrous reinforcement for the coating and acts as a bulking agent so that the coating doesn't flow once it has been applied to the substrate.

Although methyl cellulose is the preferred inorganic binder other water-soluble organic binders such as polyvinyl alcohol may be used. It is preferred to incorporate an organic cross-linking agent in the formula since the coating will be tougher when the binder is reacted with a cross-linking agent.

The following example will illustrate the invention.

EXAMPLE 1

| Solids | Parts by Weight | |
|---|---|---|
| | A | B |
| Expanded perlite particles, a 50—50 mixture of concrete and plaster grade particles | 25 | 25 |
| Fibrous grade talc | 35 | 35 |
| Calcium carbonate | 25 | 35 |
| Iceberg clay | 10 | — |
| Methyl cellulose (methocel-Dow Chemical Company) | 3 | 3 |
| Dicyandiamide | 0.25 | 0.25 |
| Fine asbestos fiber (Johns-Manville Coalinga) | 2.5 | 2.5 |
| TSPP (tetrasodiumpyro phosphate) | — | 0.5 |

To apply the above formulations the solids were initially slurried with water to form spray-on coating compositions having viscosities of about 20 poises measured at a shear rate of 60 seconds$^{11}$. In forming a white textured monolithic ceiling the spray-on coatings were applied to a fiberboard ceiling, a dry-wall ceiling and to a plastered ceiling using a Glover spray machine (Model 106-S manufactured by Glover Manufacturing Company of Van Nuys, California). In each type of ceiling construction the spray-on coating readily adhered and dried to give a tough, abrasion resistant, white textured, monolithic ceiling structure. The spray-on coating composition containing TSPP had a tendency to flow better on application and drying.

I claim:

1. A spray-on coating composition consisting essential of a water slurry having a viscosity in the range of 10 to 30 poises at a shear rate of 60 seconds$^{11}$ and containing on a dry weight basis, 5 to 35% by weight expanded perlite particles, 10 to 40% by weight fibrous talc, 15 to 18% by weight inorganic filler selected from the group consisting of clay, calcium carbonate and mixtures thereof, 1 to 4% by weight organic binder, 0 to 1% by weight cross-linking agent for said organic binder and 1 to 5% by weight coalinga asbestos fiber.

2. The spray-on coating composition in accordance with claim 1 in which the organic binder is Methyl cellulose and the cross-linking agent dicyandiamide.

3. A spray-on coating composition consisting essential of a water slurry having a viscosity of about 20 poises at a shear rate of 60 seconds$^{11}$ and containing, on a dry weight basis, 25 parts by weight expanded perlite particles, 35 parts by weight fibrous talc, 25 parts by weight calcium carbonate, 10 parts by weight clay, 3 parts by weight methyl cellulose, 0.25 parts by weight dicyandiamide and 2.5 parts by weight coalinga asbestos fiber.

* * * * *

UNITED STATES PATENT OFFICE
CERTIFICATE OF CORRECTION

Patent No. 3,617,321            Dated November 2, 1971

Inventor(s) Raymond C. Kent

It is certified that error appears in the above-identified patent and that said Letters Patent are hereby corrected as shown below:

In the Abstract, last line, "shear rate of 60 second $^1$1." should read -- shear rate of 60 seconds $^{-1}$. --. Column 1, line 53, "a shear rate of 60 seconds $^{11}$" should read -- a shear rate of 60 seconds $^{-1}$ --. Column 2, line 7 of Example I, "Methyl cellulose (methocel-" should read -- Methyl cellulose (Methocel- --; line 12 of Example I, "TSPP (tetrasodiumpyro" should read -- TSPP (tetrasodiumpyro- --; line 33, "of 60 seconds $^{11}$" should read -- of 60 seconds $^{-1}$ --; line 46, "60 seconds $^{11}$" should read -- 60 seconds $^{-1}$ --; line 58, "rate of 60 seconds $^{11}$" should read -- rate of 60 seconds $^{-1}$ --.

Signed and sealed this 9th day of May 1972.

(SEAL)
Attest:

EDWARD M. FLETCHER, JR.            ROBERT GOTTSCHALK
Attesting Officer            Commissioner of Patents